(12) United States Patent
Hörlendsberger et al.

(10) Patent No.: US 11,180,948 B2
(45) Date of Patent: Nov. 23, 2021

(54) DOOR MODULE FOR ARRANGING IN A DOOR OPENING OF A WAGON BODY OF A VEHICLE

(71) Applicant: KNORR-BREMSE GESELLSCHAFT MIT BESCHRÄNKTER HAFTUNG, Mödling (AT)

(72) Inventors: Christian Hörlendsberger, Waidhofen /Ybbs (AT); Andreas Mair, Oberschlierbach (AT); Christian Allmer, Gresten (AT)

(73) Assignee: KNORR-BREMSE GESELLSCHAFT MIT BESCHRÄNKTER HAFTUNG

( * ) Notice: Subject to any disclaimer, the term of this patent is extended or adjusted under 35 U.S.C. 154(b) by 253 days.

(21) Appl. No.: 16/462,844

(22) PCT Filed: Oct. 18, 2017

(86) PCT No.: PCT/EP2017/001227
§ 371 (c)(1),
(2) Date: May 21, 2019

(87) PCT Pub. No.: WO2018/091123
PCT Pub. Date: May 24, 2018

(65) Prior Publication Data
US 2019/0309570 A1    Oct. 10, 2019

(30) Foreign Application Priority Data
Nov. 21, 2016  (DE) .......................... 102016013797.5

(51) Int. Cl.
*B61D 19/02* (2006.01)
*E06B 7/23* (2006.01)
*B60J 10/40* (2016.01)

(52) U.S. Cl.
CPC ............ *E06B 7/2303* (2013.01); *B60J 10/40* (2016.02); *B61D 19/02* (2013.01)

(58) Field of Classification Search
CPC ....................................................... B60J 10/40
See application file for complete search history.

(56) References Cited

U.S. PATENT DOCUMENTS 2,797,958 A * 7/1957 Podolan ................... B60J 10/80
49/371
3,126,591 A * 3/1964 Hamilton .............. E06B 7/2318
49/489.1
(Continued)

FOREIGN PATENT DOCUMENTS

AT         10518 U1     5/2009
AT         512598 A1    9/2013
(Continued)

OTHER PUBLICATIONS

International Search Report and Written Opinion of the International Search Report for PCT/EP2017/001227, dated Feb. 1, 2019.
(Continued)

*Primary Examiner* — Catherine A Kelly
(74) *Attorney, Agent, or Firm* — Barnes & Thornburg LLP

(57) ABSTRACT

A first moulding element is arranged on a vertical edge of a door leaf, and at least one second moulding element is arranged on a vertical strut of a door frame, wherein the first moulding element and the second moulding element intermesh automatically only in the closed position of the door leaf in such a manner that a direct or indirect form fit is automatically produced between the first moulding element and the second moulding element, as seen in a direction perpendicular to the plane of the door leaf, but such a form
(Continued)

fit is automatically removed in a position of the door leaf differing from the closed position.

12 Claims, 6 Drawing Sheets

(56) References Cited

U.S. PATENT DOCUMENTS

| | | | | |
|---|---|---|---|---|
| 3,337,995 | A * | 8/1967 | Taylor | B61D 19/005 49/426 |
| 3,407,537 | A * | 10/1968 | Urbanick | E06B 3/4636 49/483.1 |
| 4,726,147 | A * | 2/1988 | Beske | E06B 3/4609 49/406 |
| 5,140,770 | A * | 8/1992 | Morvan | B61D 19/02 49/215 |
| 5,142,823 | A * | 9/1992 | Brandenburg | B60J 5/062 49/118 |
| 5,295,326 | A * | 3/1994 | Dickey | E06B 7/18 49/482.1 |
| 5,355,628 | A * | 10/1994 | Dranchak | B60J 10/38 49/483.1 |
| 5,553,871 | A * | 9/1996 | Rowe | E06B 5/164 277/644 |
| 6,125,591 | A | 10/2000 | Schmidhuber et al. | |
| 6,914,184 | B1 * | 7/2005 | Lahita | H05K 9/0015 174/374 |
| 6,932,415 | B1 * | 8/2005 | Van Houzen | B60J 10/24 296/146.2 |
| 7,426,803 | B2 * | 9/2008 | Fronz | B61D 19/008 49/209 |
| 7,451,714 | B1 * | 11/2008 | Redfern | B63B 19/26 114/117 |
| 7,934,342 | B2 * | 5/2011 | Lahnala | B60J 1/1853 49/380 |
| 8,328,268 | B2 * | 12/2012 | Charnesky | B60J 10/86 296/146.9 |
| 9,403,540 | B2 * | 8/2016 | Takahashi | B61D 19/00 |
| 9,751,390 | B2 * | 9/2017 | Roth | B60J 10/40 |
| 2011/0154741 | A1 | 6/2011 | Pellegrini | |
| 2016/0280053 | A1 * | 9/2016 | Joren | F16J 15/027 |

FOREIGN PATENT DOCUMENTS

| | | | |
|---|---|---|---|
| CN | 204113062 U | 1/2015 | |
| CN | 204937465 U | 1/2016 | |
| CN | 205355625 U | 6/2016 | |
| CN | 205531975 U | 8/2016 | |
| DE | 911376 C | 5/1954 | |
| DE | 2206186 A1 * | 8/1972 | ........... E06B 3/4645 |
| DE | 3710451 A1 | 10/1988 | |
| DE | 19701681 C1 | 4/1998 | |
| DE | 20311653 U1 | 10/2003 | |
| DE | 202004007407 U1 | 9/2005 | |
| DE | 202007008489 U1 | 9/2007 | |
| DE | 202008004518 U1 | 8/2009 | |
| DE | 102009043723 A1 | 4/2011 | |
| EP | 1607299 A2 | 12/2005 | |
| EP | 1687191 A1 | 8/2006 | |
| EP | 2197725 A1 | 6/2010 | |
| EP | 2883728 A1 | 6/2015 | |

OTHER PUBLICATIONS

Chinese Office Action Corresponding to CN201780082746.3, dated May 28, 2020.

* cited by examiner

DOOR MODULE FOR ARRANGING IN A DOOR OPENING OF A WAGON BODY OF A VEHICLE

PRIORITY CLAIM

This patent application is a U.S. National Phase of International Patent Application No. PCT/EP2017/001227, filed Oct. 18, 2017, which claims priority to German Patent Application No. 10 2016 013797.5, filed Nov. 21, 2016, the disclosures of which are incorporated herein by reference in their entirety.

FIELD

Disclosed embodiments relate to a door module and to a method for arranging a door module in a door opening of a wagon body of a vehicle.

BACKGROUND

Door module, or a car body, or a vehicle, respectively, are known from EP 2 883 728, for example. An elastically deformable sealing element therein is disposed on an end face of the vertical periphery of the door wing so as in the closing position to seal in relation to an opposite end face of the vertically disposed strut of the door portal. Such door wings are often mounted at the floor side and/or the top side in guides which are disposed in a rigid or movable manner on the horizontal struts. Consequently, such a door wing is without a mounting between the two upper and lower guides.

This results in the problem that the door wing in the traveling operation is exposed to stresses which are, for example, pressure differentials when the vehicle enters a tunnel, or else when vehicles pass one another. Passengers leaning or falling against the door wing can also exert stresses on the door wing.

It cannot always be prevented by virtue of the intensity of the stresses and by virtue of the rigidity of the door wing in terms of shape or material that the door wing, above all in the event of a centric stress, flexes outward vertically between the two upper and lower guides. On account thereof, the sealing effect of the sealing element can be canceled, on the one hand, because the sealing element as a result of the flexing of the door wing is lifted from the opposite sealing face thereof. In this instance, comfort can be compromised as a result of noises, but damage by way of invading media such as water can also arise.

On the other hand, the deformation of the door wing in the event of stress from the inside can be so large that the door wing in the traveling operation is outside the permissible dynamic delimitation line (load gauge), and a collision with a tunnel wall or a vehicle traveling in the opposite direction can even arise on account thereof.

SUMMARY

Disclosed embodiments are directed at refining a door module of the type mentioned at the outset in such a manner that the problems described above are avoided. A car body having such a door module as well as a rail vehicle having such a car body are likewise to be made available.

Disclosed embodiments provides a door module for the disposal in a door opening of a wall of a car body of a vehicle, in particular of a rail vehicle, having at least one door wing; a door portal which comprises two vertically disposed struts and two horizontally disposed struts, wherein the door wing is movable, relative to the door portal, between an opening position of a closing position, and at least one elastically deformable sealing element which in the closing position seals at least the vertical periphery of the door wing in relation to one of the vertically disposed struts, and having an electronic door control system which is provided for locking/unlocking or blocking/releasing the at least one door wing in relation to the door portal.

Disclosed embodiments, furthermore, also relate to a car body for a vehicle, in particular for a rail vehicle, as well as to a vehicle, in particular a rail vehicle, having a car body.

BRIEF DESCRIPTION OF THE FIGURES

In the embodiments described herein, identical components and functional groups, and components and functional groups of equal function, are identified by the same reference signs. Disclosed embodiments will be described in more detail hereunder by means of exemplary embodiments with reference to the appended drawing in which.

DETAILED DESCRIPTION

Figure 1:
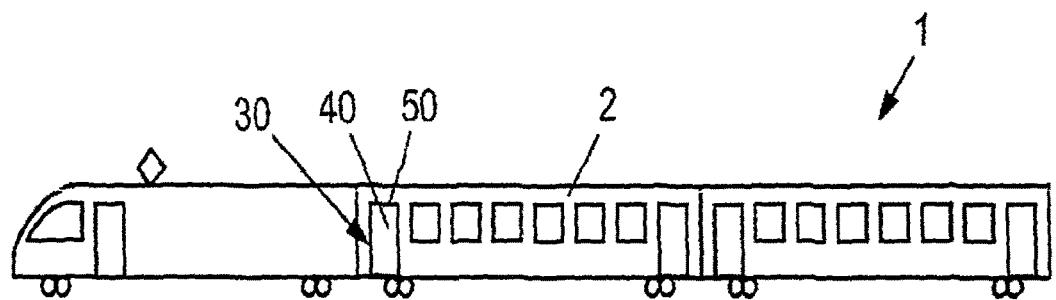
FIG. 1 shows a lateral view of a rail vehicle having door modules according to the disclosed embodiments.

Disclosed embodiments provide a door module for the disposal in an opening of a wall of a car body of a vehicle, in particular of a rail vehicle. Such a door module can therefore be inserted in the opening of the car body so as to close the opening and to open the opening when required by means of the door wing that is capable of being driven manually or by a motor.

Drivable door wings, apart from door wings that are driven by an external force such as, for example, a motor, also close door wings which are driven or operated by hand by a driver or a passenger.

The door module can comprise external sliding doors in which a movement of the door wing or door leaf is performed outside the car, so as to be parallel with the external face of the car, sliding pocket doors in which a movement of the door wing or door leaf is performed in a door pocket, so as to be parallel with the external face of the car, as well as pivoting-and-sliding doors in which a movement is initially performed simultaneously in a vertical and parallel manner and subsequently is performed on the inside/on the outside, only so as to be parallel with the external face of the car.

A rail vehicle is to be understood as a track-bound vehicle such as a locomotive, a multiple unit, a rail motor car, a tram, an underground rail vehicle, a coach or wagon, such as a passenger or long-distance coach and/or freight wagon, in particular a high-speed rail vehicle. Alternatively, the door module can be used for any other type of vehicle, for example also for motor buses.

Disclosed embodiments is characterized by at least one first molded element that is disposed on the vertical periphery of the door wing, and by at least one second molded element that is disposed on the vertical strut of the door portal, wherein the first molded element and the second molded element only in the closing position of the door wing automatically engage in one another in such a manner that, when viewed in a direction perpendicular to the plane of the door wing, a direct or indirect form-fit is automatically produced between the first molded element and the second molded element, but such a form-fit is or will be automatically canceled in a position of the door wing that deviates from the closing position, wherein the automatic accomplishing and canceling of the form-fit is controlled by the movement of the door wing in the closing or opening direction and is separate from and independent of the electronic door control system.

The automatic accomplishing and canceling of the form-fit that is controlled by the movement of the door wing in the closing or opening direction is optionally, exclusively mechanical and in particular separate from and independent of the electronic door control system which is provided for locking/unlocking or blocking/releasing the at least one door wing on the door portal. Such electronic door control systems control a door drive such as a pneumatic door drive, an electromotive door drive, or a combination of both, as well as a door blocking mechanism as well as safety functions such as the identification of obstacles.

A direct form-fit is to be understood to be a form-fit in which no further element is disposed between the first molded element and the second molded element. By contrast, an indirect form-fit is to be understood to be a form-fit in which at least one further element, in particular the elastically deformable sealing element, is disposed between the first molded element and the second molded element.

The first molded element and the second molded element mutually engaging means that, for example, one of the molded elements has a protrusion or a projecting portion which engages in an opening of the other molded element, or engages behind an undercut cross section of the other molded element, so as to bring about the form-fit.

Form-fit when viewed in a direction perpendicular to the plane of the door wing means that the direction of the form-fit does not have to be aligned exclusively perpendicularly to the plane of the door wing. It suffices for only a vectoral proportion of the form-fit that is also aligned so as to be oblique to the plane of the door wing to be disposed so as to be perpendicular to the plane of the door wing, so as to prevent a movement of the door wing perpendicular to the plane thereof in the closing position.

By contrast, such a form-fit is absent in a position that deviates from the closing position, or such a form-fit is automatically canceled, respectively, which the opening position or a position between the opening position and the closing position of the door wing is assumed, for example. The automatic accomplishment of the form-fit only in the closing position however also includes positions of the door wing such as arise shortly before reaching a final terminal position of the closing position and in which the form-fit is at least in part already configured (for example by way of contact between the molded elements), before the form-fit is then completely configured after a further movement of the door wing to the final terminal position of the closing position. The highest degree of contact, or the greatest contact pressure, between the two molded element is present in the final terminal position, for example.

The sealing effect as a result of an interaction of the elastically deformable sealing element and the respective assigned partner such as, for example, a molded element, is optionally accomplished only when the closing position of the door wing is assumed, or upon the door wing assuming the position.

Utility of the measures according to the disclosed embodiments lies in that the door wing by way of the form-fit between the first molded element and the second molded element on the door portal is fixed in a direction perpendicular to the plane of the door wing and stress-related deformations in a direction perpendicular to the plane of the door wing are therefore reduced. This also has a positive effect on the sealing effect of the elastically deformable sealing element which then, disposed either on the vertical strut of the door portal or on the vertical periphery of the door wing, is exposed to less movement which could move the elastically deformable sealing element out of contact with the vertical periphery of the door wing or with the vertical strut of the door portal and thus could reduce or cancel the sealing effect. A loss of comfort as a result of noises, or else damage by invading media such as water, are then avoided.

The sealing element can be embodied in one part or multiple parts and can be provided only along the vertical strut of the door portal or the vertical periphery of the door wing, or else so as to be partially or completely encircling. The sealing element can also be interrupted at some locations.

In accordance with disclosed embodiments, a first molded element and/or the second molded element at least in part are/is particularly optionally formed by the at least one elastically deformable sealing element. In other words, the rigidity of the at least one elastically deformable sealing element in this instance is so high that a form-fit that increases the rigidity of the door wing in a direction perpendicular to the plane of the door wing can be configured. This can be achieved, for example, by an elastomer having a Shore hardness of approx. 100 Shore, the elastomer, apart from the form-fit, also being able to produce a certain sealing effect. A useful unification of functions is present in this instance.

Alternatively, the at least one elastically deformable sealing element can also be configured so as to be separate from the first molded element and the second molded element, on account of which the function of the form-fit is performed by the two molded elements, and the sealing function is performed by the at least one elastically deformable sealing element. As has already been explained above, the form-fit in this instance ensures that the sealing function in the direction perpendicular to the plane of the door wing is maintained in an almost stress-independent manner.

In the case of this alternative, the first molded element or the second molded element can support at least one elastically deformable sealing element in such a manner that the at least one elastically deformable sealing element when accomplishing the form-fit in the closing position configures a component part of the form-fit, in that the elastically deformable sealing element, supported by the first molded element, and the second molded element mutually engage in a form-fitting manner, or the elastically deformable sealing element, supported by the second molded element, and the first molded element mutually engage in a form-fitting manner.

In this instance, an indirect form-fit is configured, as has already been described above. This alternative also offers the utility that, caused by at least one elastically deformable sealing element being interposed between the first and the second molded element, vibrations, inevitably arising in traveling vehicles, of the door wing that is guided in a movable manner on the door portal are damped by the at least one elastically deformable sealing element and, on account thereof, lead to less structure-borne noise being formed.

For example, the first molded element can be disposed on a door face of the door wing which, when viewed in relation to the car body, points inward, and the second molded element can be disposed on a strut face of the vertical strut of the door portal which, when viewed in relation to the car body, points outward, or the first molded element can be disposed on a door face of the door wing which, when viewed in relation to the car body, points outward, and the second molded element can be disposed on a strut face of the vertical strut of the door portal which, when viewed in relation to the car body, points inward.

Optionally, first and second wedge faces may be configured so as to be complementary can be disposed on the first molded element and/or on the second molded element and/or on the at least one elastically deformable sealing element in such a manner that the effect of the form-fit and/or the sealing effect, in a movement of the door wing proceeding from a position of the door wing in which the latter has not yet fully assumed the closing position, increases in the direction toward the terminal position of the closing position. On account of a wedge-shaped cross section of the elastically deformable sealing element, the latter is elastically compressed when the closing position is assumed. On account thereof, the sealing effect is usefully increased in a movement of the door wing in the direction of the closing position.

This can be implemented, for example, in that the first molded element, when viewed in a horizontal plane, has a cross section that projects in a wedge-shaped manner, the cross section in the closing position engaging in a cross section in the second molded element which is recessed in a wedge-shaped manner, wherein the central axes of the wedge-shaped cross sections are disposed so as to be perpendicular to the plane of the door wing. Of course, the cross sections that project in a wedge-shaped manner and are recessed in a wedge-shaped manner can also be disposed in the reverse order in relation to the two molded elements. In this instance, the second molded element, when viewed in a horizontal plane, has a cross section that projects in a wedge-shaped manner, the cross section in the closing position engaging in a cross section in the first molded element which is recessed in a wedge-shaped manner, wherein the central axes of the wedge-shaped cross sections are again disposed so as to be perpendicular to the plane of the door wing.

According to one refinement, the first molded element or the second molded element, at least in the region of the cross section that projects in a wedge-shaped manner, or in the region of the cross section that is recessed in a wedge-shaped manner, can herein support the at least one elastically deformable sealing element. In this case, the indirect form-fit that has already been described above is configured between the first and the second molded element.

The sealing element herein can likewise have a corresponding cross section that projects in a wedge-shaped manner or a cross section that is recessed in a wedge-shaped manner, or be imparted such a cross section also only when assuming the closing position by the door wing, for example when the at least one elastically deformable sealing element has an encased hollow region. Caused by the hollow region, the elastically deformable sealing element, proceeding from an arbitrary initial geometry, in terms of the shape thereof can better adapt to the complementary wedge-shaped cross section of the other molded element when the form-fit is accomplished.

The elastically deformable sealing element, on account of the wedge-shaped cross section thereof, is elastically compressed when the closing position is assumed. On account thereof, the sealing effect is usefully increased in a movement of the door wing in the direction of the closing position.

According to one refinement, the first molded element and/or the second molded element can have at least one base and at least one part that is movable in relation to the base in such a manner that the form-fitting mutual engagement of the first molded element and of the second molded element is accomplished by a movement of the movable part when assuming the closing position. The movement of the movable part in relation to the stationary base that causes the form-fit is initiated by the movement of the door wing to the closing position. For example, arbitrary gear mechanisms which convert the movement of the door wing to a movement of the movable part of the respective molded element can be used herein. However, at least one detent which is disposed on the vertical strut of the door portal and which impacts the movable part of the respective molded element when the door wing approaches the closing position and, on account thereof carries out the movement initiating the form-fit, is also conceivable in this context.

According to one embodiment, the first molded element and the second molded element and/or the at least one elastically deformable sealing element can be disposed so as to be coplanar in relation to the plane of the door wing. This can be implemented, for example, in that the first molded element and the second molded element and/or the at least one elastically deformable sealing element are disposed on opposite end faces on the vertical strut of the door portal and on the vertical periphery of the door wing, wherein the surface normals of the end face point in the movement direction of the door wing when opening and closing, for example. A relatively narrow cross section of the door wing results in this instance.

Alternatively, the first molded element and the second molded element and/or the at least one sealing element can be disposed so as to be outwardly or inwardly offset in relation to the plane of the door wing. This can be implemented, for example, in that the first molded element and/or the second molded element are supported by profiled strips or are formed by the latter, the profiled strips being fastened to the vertical periphery of the door portal and/or to the vertical strut of the door portal, and a leg that in relation to the plane of the door wing protrudes from the profiled strips outwardly or inwardly supporting the at least one sealing element, for example.

In relation to the vertical disposal and extent of the molded elements it can be provided, for example that the first molded element is disposed so as to be approximately centric in relation to the vertical periphery of the door wing, and the second molded element is disposed so as to be approximately centric in relation to the vertical strut of the door portal, or that the first molded element is disposed in relation to the vertical periphery of the door wing, and the second molded element is disposed in relation to the vertical strut of the door portal, in each case so as to be along the entire vertical extent of the vertical periphery of the door wing and of the vertical strut of the door portal, or that a plurality of first molded elements are disposed in relation to the vertical periphery of the door wing, and a plurality of second molded elements are disposed in relation to the vertical strut of the door portal, so as to have in each case a mutual vertical spacing.

The door wing optionally may carry out a combined distancing/displacing movement (pivoting-and-sliding door) or only a linear displacing movement (sliding door) in relation to the door portal. Disclosed embodiments are, therefore, suitable for door wings that are moved in a purely linear manner in relation to the door portal as well as for door wings which carry out a combined displacing/distancing movement in relation to the portal.

Disclosed embodiments likewise also relate to door modules having two door wings, wherein first and second molded elements are optionally in each case disposed on the two vertical struts of the door portal as well as on the opposite vertical peripheries of both door wings, and at least one elastically deformable sealing element is assigned to each pairing of one vertical periphery of a door wing and one vertically disposed strut of the door portal.

Disclosed embodiments also relate to a car body for a vehicle, in particular for a rail vehicle, having at least one wall having an opening in which an above-described door module is disposed, and to a vehicle, in particular a rail vehicle, having at least one such car body.

The disclosed embodiment of a vehicle 1 having a door module according to the disclosed embodiments shown in FIG. 1 is a rail vehicle having a locomotive and a plurality of cars, wherein fundamental components are explained using the example of the first car. The components may be, however, also to be found on the locomotive and on the further cars. The car may comprise an external wall 2 and a plurality of door modules 30 which comprise in each case one door wing 40, one door portal 50, and one elastically deformable sealing element 60 as a door seal.

Figure 2:
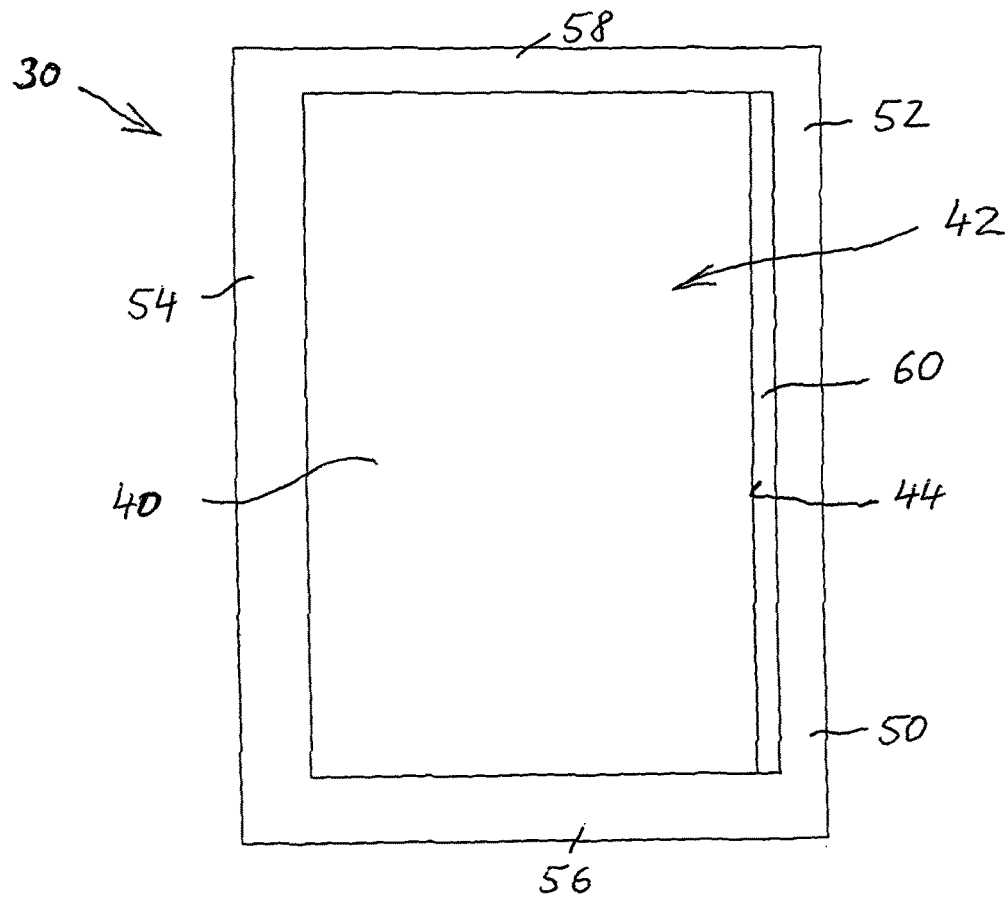
FIG. 2 shows a front view of a door module according to the disclosed embodiments.

According to FIG. 2, the door portal 50 comprises two vertically disposed struts 52, 54 and two horizontally disposed struts 56, 58, wherein the door wing 40, relative to the door portal 50, is driven by a motor, here by way of an electronic door control system, for example, between an opening position and a closing position so as to open a door opening 42 for passengers to enter and alight when stopped, or to close the door opening 42 during travel, respectively. In the case of the embodiment of FIGS. 3a and 3b, the door wing 40 in relation to the door portal 50 carries out a purely linear displacing movement, for example. The elastically deformable sealing element 60, and here the sealing element 60 which is disposed so as to encircle the struts 52 to 58 of the door portal 50, for example, in the closing position then seals the door wing 40 in relation to the door portal 50.

In general, at least one first molded element 46 that is disposed on a vertical periphery 44 of the door wing 40, and at least one second molded element 48 that is disposed on the vertical strut 52 of the door portal 50 are provided, the vertical strut 52 being opposite the vertical periphery 44.

Figure 3A:
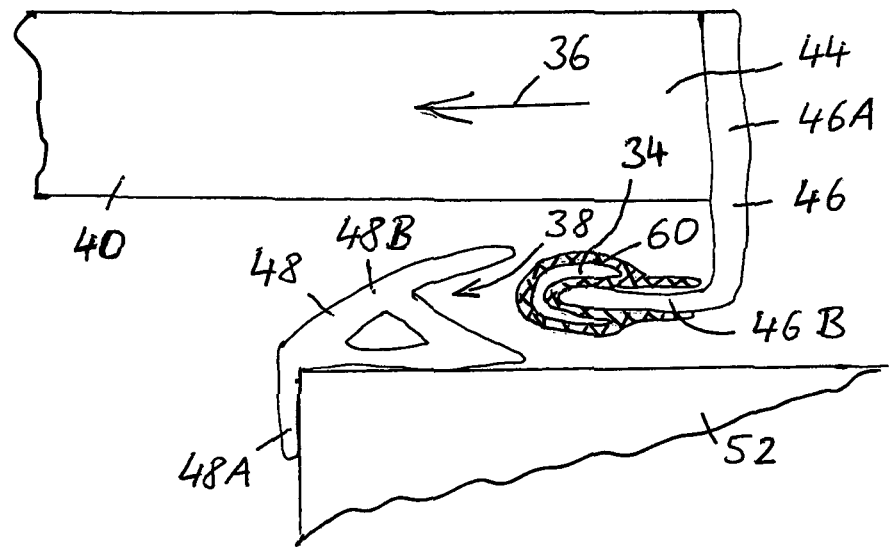
FIG. 3A shows a horizontal section through a fragment of a door module according to one disclosed embodiment of the disclosed embodiments, shortly before reaching the closing position of the door wing.
Figure 3B:
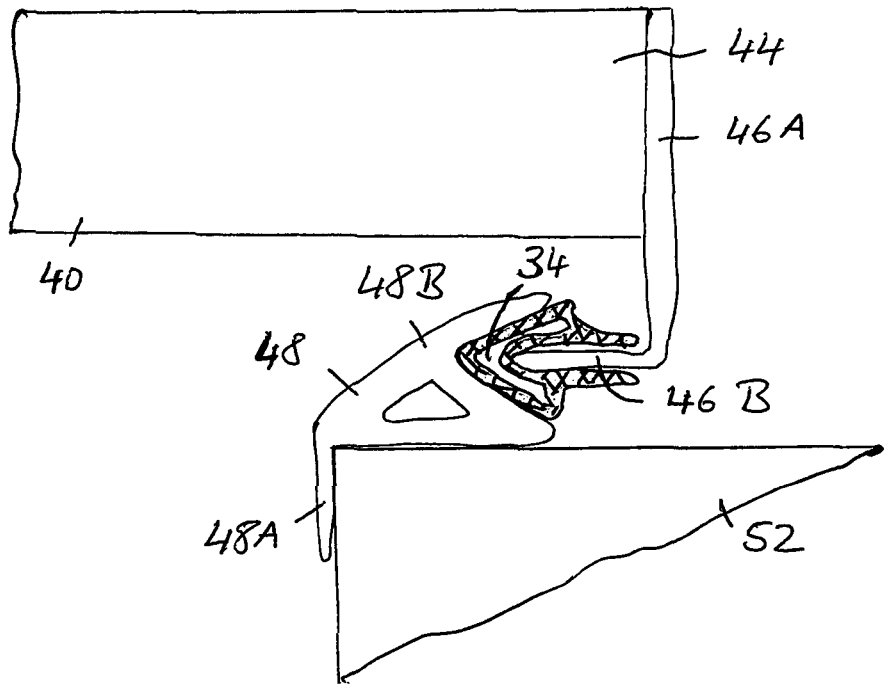
FIG. 3B shows the door wing of FIG. 3A in the final closing position thereof.

In the case of the embodiment of FIG. 3A and FIG. 3B the first molded element 46 is composed of a vertical profile strip of which a first leg 46A at the end face of the vertical periphery 44 of the door wing 40 and a second leg 46B that is bent perpendicularly to the door opening 42 support the elastically deformable sealing element 60. The second molded element 48 is likewise composed of a vertical strip which by way of a first leg 48A is fastened to the end face of the vertical strut 52 and on a second leg 48B has a clearance 38 having a wedge-shaped cross section, wherein a central axis of the wedge-shaped cross section is parallel with the moving direction of the door wing 40 that in FIG. 3A is symbolized by an arrow 36. The elastically deformable sealing element 60 has an encased hollow region 34 which, when not deformed, has an approximately oval cross section. The clearance 38 having the wedge-shaped cross section in the second molded element 48 is flush with the elastically deformable sealing element 60 that is supported by the first molded element 46.

The first molded element 46, in relation to the interior space of the car body, is disposed on the inside on the door wing 40, and the second molded element 48, in relation to the interior space of the car body, is disposed on the outside on the vertical strut 52 of the door portal 50. FIG. 3A illustrates a position of the door wing 40 shortly before reaching the final terminal position of the closing position, and FIG. 3B finally illustrates the final closing position. The direction of the arrow 36 in FIG. 3A points toward the moving direction of the door wing 40 from the opening position to the closing position.

In the closing position of the door wing 40 shown in FIG. 3B, the first molded element 46 and the second molded element 48 mutually engage in such a manner that, when viewed in a direction perpendicular to the plane of the door wing 40 or perpendicular to the travel direction of the rail vehicle 1, a form-fit is accomplished between the first molded element 46 and the second molded element 48. As can be easily imagined by means of FIG. 3A and FIG. 3B, no such form-fit is accomplished in the positions of the door wing 40 that deviate from the closing position. The, for example, indirect form-fit here between the two molded elements 46, 48 is accomplished in that the elastically deformable sealing element 60 that is supported by the first molded element 46 when assuming the closing position plunges so as to be flush into the wedge-shaped clearance 38 that is configured in the second molded element 48 and, on account of the compression capability of the hollow region 34, in terms of the cross section of the elastically deformable sealing element 60 adapts to the wedge-shaped cross section of the clearance 38. The form-fit between the first molded element 46 and the second molded element 48 here is optionally indirect because the elastically deformable sealing element 60 is disposed therebetween and on account thereof, apart from the two molded elements 46, 48, likewise participates in the form-fit. Furthermore, the sealing effect caused by the sealing element 60 is then also increased in the sense of a self-amplification when the closing position is assumed by the door wing 40.

Figure 4A:
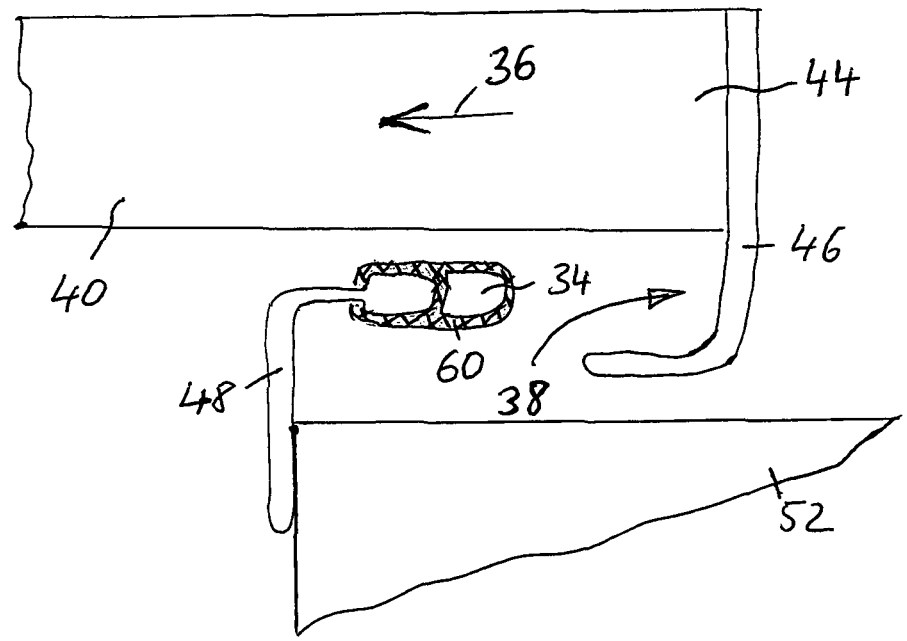
FIG. 4A shows a horizontal section through a fragment of a door module according to one further embodiment of the disclosed embodiments, shortly before reaching the closing position of the door wing.
Figure 4B:
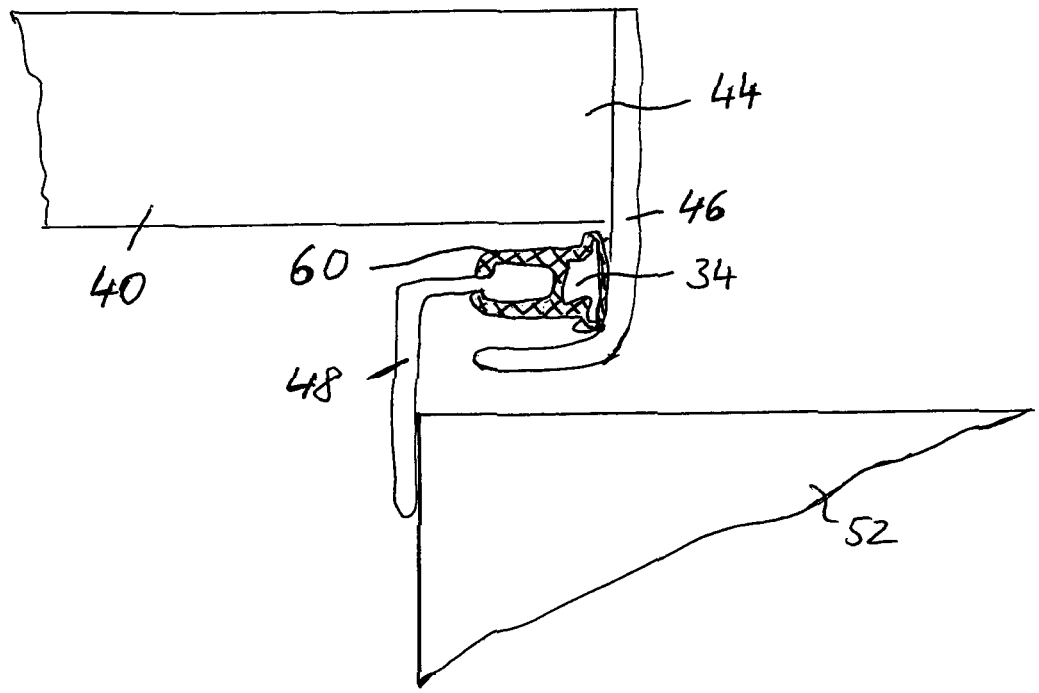
FIG. 4B shows the door wing of FIG. 4A in the final closing position thereof.

By contrast to the embodiment of FIGS. 3A and 3B, the elastically deformable sealing element 60 in the case of the embodiment of FIG. 4A and FIG. 4B is supported by the second molded element 48 that is disposed on the vertical strut 52 of the door portal 50. Furthermore, the cross section of the clearance 38 of the first molded element 46 that is supported by the vertical periphery 44 of the door wing 40 here is not wedge-shaped but rather cup-shaped, such that the free end of the cross section of the sealing element 60, by virtue of the hollow region 34, is laterally widened when contacting the base of the clearance 38 (FIG. 4B) and in this way configures the form-fit perpendicular to the plane of the door portal 50.

Figure 5:
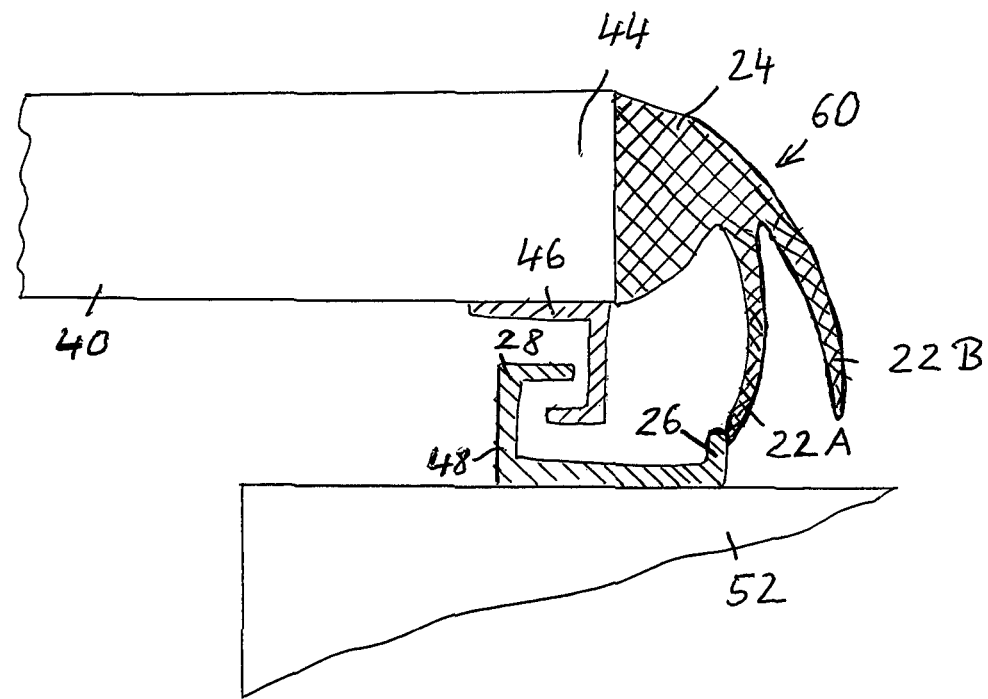
FIG. 5 shows a horizontal section through a fragment of a door module according to one further embodiment of the disclosed embodiments, in the final closing position of the door wing.
Figure 7:
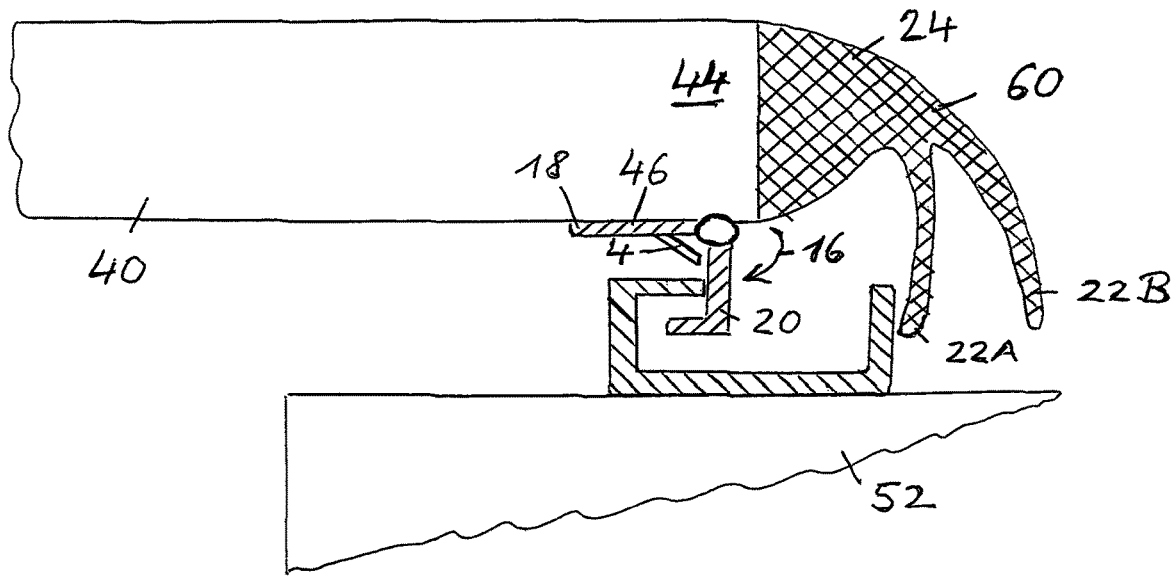
FIG. 7 shows a horizontal section through a fragment of a door module according to one further embodiment of the disclosed embodiments, in the final closing position of the door wing.

In the case of the embodiments of FIG. 5 and FIG. 7 the two molded elements 46, 48 that initiate the form-fit are embodied separately and so as to be separate from the elastically deformable sealing element 60. Moreover, the door wing 40 here no longer carries out a purely linear movement in order for the closing position to be assumed, but a combined pivoting and displacing movement as is indicated by the arrow 32.

In FIG. 5 the first and the second molded element 46, 48 are embodied, for example, as profiled strips which in the cross section are configured in a complimentary manner so as to be cook-shaped, wherein the second molded element 48 has a U-shaped cross section for example, and a first leg 28 of the U-profile is embodied as a hook for the form-fit, and the second leg 26 of the U-profile serves as a detent for the elastically deformable sealing element 60 in the closing position. The elastically deformable sealing element 60 here, for example, has two seal lips 22A, 22B which protrude away from a base 24 that is disposed on the end face of the periphery 44 of the door wing 40 inwardly toward the vertical strut 52 of the door portal 50. One seal lip 22A of the two seal lips 22A, 22B then assumes the sealing function by way of contact with the second leg 26 of the second molded element 48 in the closing position.

Figure 6:
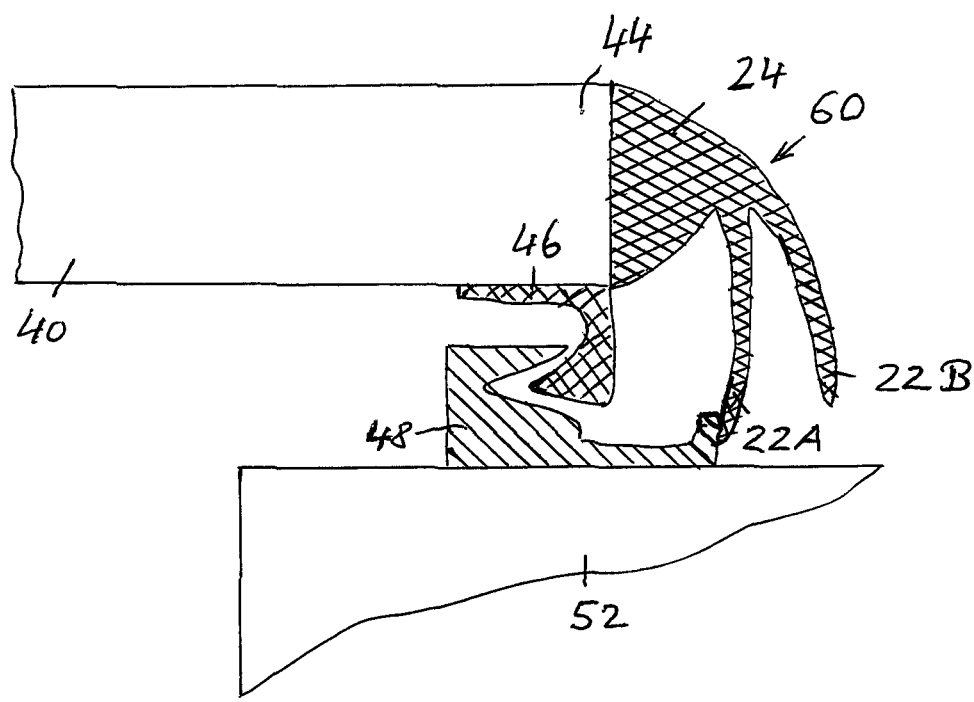
FIG. 6 shows a horizontal section through a fragment of a door module according to one further embodiment of the disclosed embodiments, in the final closing position of the door wing.

In the case of the embodiment of FIG. 6 the first molded element 46 and the second molded element 48 are again embodied as wedge cross sections that are configured so as to be complimentary. In each case one profile strip from an elastomer having a Shore hardness of approx. 100 Shore is optionally used here as a molded element 46, 48.

In the case of the embodiment of FIG. 7 the first molded element 46 is configured as a foldable hook from which a first leg, here a hook-shaped leg 20, for example, in a spring-pretensioned manner is foldable, about a vertical axis in relation to a second leg 18 that is disposed on the periphery 44 of the door wing 40, up to a detent 4, as is visualized by the arrow 16 in FIG. 7. This embodiment enables a better equalization of tolerances as well as a simpler removal and installation of the door wing 40. The sealing element 60 is again designed as in the embodiments according to FIG. 5 and FIG. 6.

Figure 8:
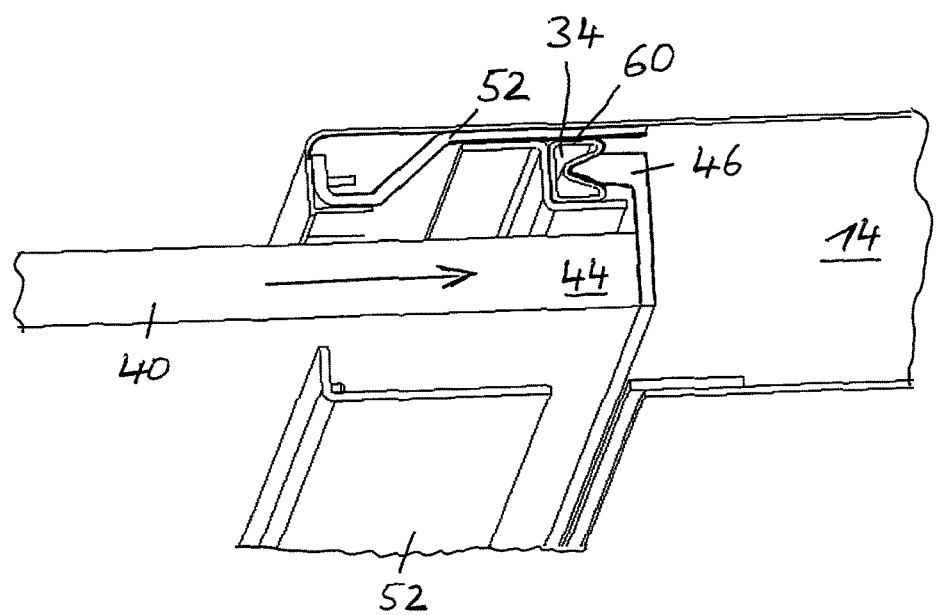
FIG. 8 shows a perspective view of a fragment of a door module according to one further embodiment of the disclosed embodiments, in the final closing position of the door wing.

FIG. 8 again shows an embodiment in which the door wing 40 carries out a purely linear displacing movement. The vertical periphery 44 of the door wing 40, when assuming the closing position, here moves out of a cavity 14 of the vertical strut 52 of the door portal 50. The arrow in FIG. 8 to this extent symbolizes the movement in the direction of the opening position. The first molded element 46, disposed on the vertical periphery 44 of the door wing 40, here protrudes outward and on the free leg thereof that is disposed so as to be parallel with the plane of the door wing 40 has a wedge-shaped cross section. The elastically deformable sealing element 60 here is disposed so as to be encircling (vertically and horizontally) on all four struts 52 to 58 of the door portal 50, for example, and is received in a clearance 12 having, for example, a rectangular cross section, of the second molded element 48. Furthermore, the elastically deformable sealing element 60 in the non-deformed state, that is to say in the positions of the door wing 40 that deviate from the closing position, has a rectangular cross section which however, by virtue of an encased hollow region 34 that is disposed on the inside, adapts in a wedge-shaped manner when the wedge-shaped cross section of the first molded element 46 is pushed in the closing position shown in FIG. 8 and, on account thereof, causes the form-fit.

In the case of the embodiments of FIG. 3a to FIG. 8 the vertical periphery 44 of the door wing 40 and the vertical strut 52 of the door portal 50 overlap in the closing position, when viewed in a direction perpendicular to the plane of the door portal 50, wherein the two molded elements 46, 48 are disposed so as to point toward one another.

Figure 9:
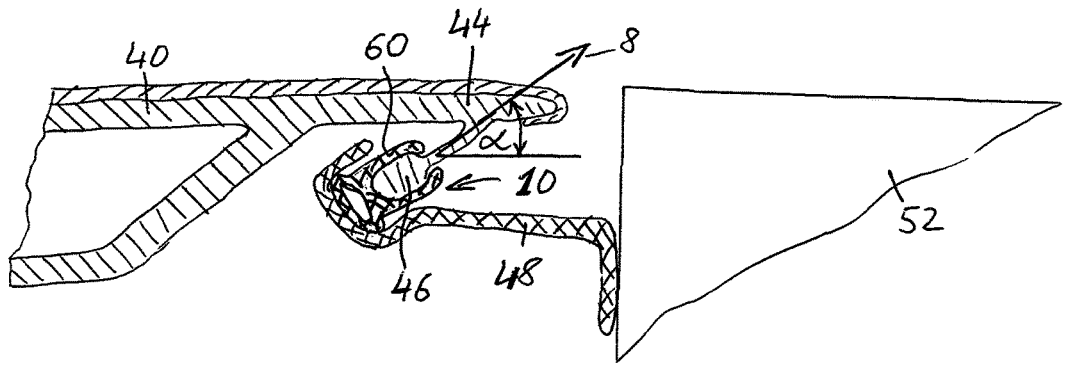
FIG. 9 shows a horizontal section through a fragment of a door module according to one further embodiment of the disclosed embodiments, in the final closing position of the door wing.
Figure 10:
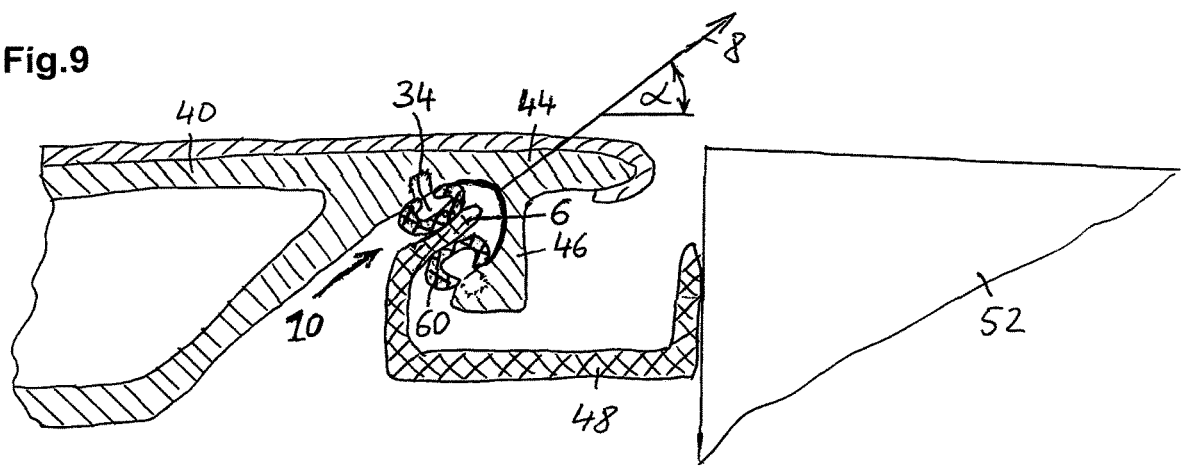
FIG. 10 shows a horizontal section through a fragment of a door module according to one further embodiment of the disclosed embodiments, in the final closing position of the door wing.
Figure 11:
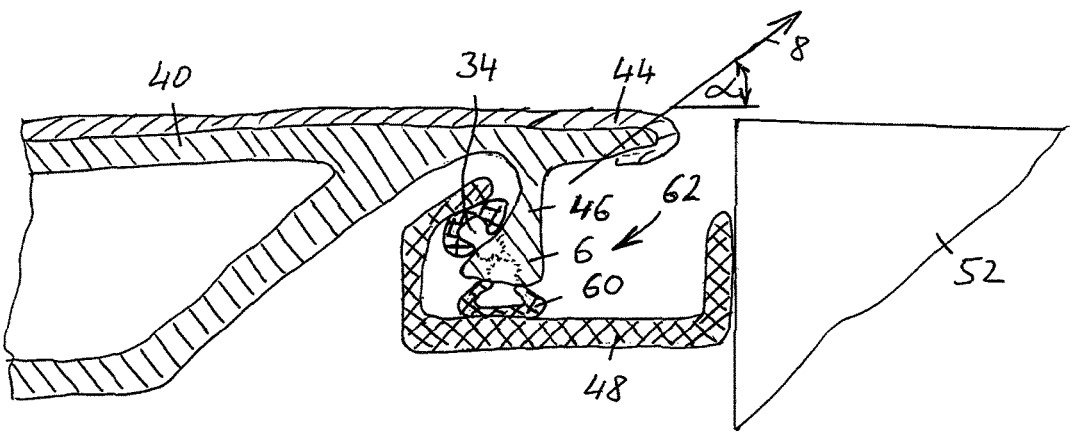
FIG. 11 shows a horizontal section through a fragment of a door module according to a further embodiment of the disclosed embodiments, in the final closing position of the door wing.

In the case of the embodiments of FIG. 9 to FIG. 11 the vertical periphery 44 of the door wing 40 and the vertical strut 52 of the door portal 50 do not overlap in the closing position. However, the second molded element 48 here, when viewed in a direction parallel with the plane of the door wing 40, protrudes away from the vertical strut 52 toward the periphery 44 of the door wing 40, for example, and according to FIG. 9 configures an end-side clearance 10, the central axis thereof being approximately parallel with the movement of the door wing 40 that is symbolized by an arrow 8 and is carried out by the door wing 40 in the context of a combined distancing/displacing movement (pivoting-and-sliding door), so as to reach the closing position from the opening position and vice versa. The elastically deformable sealing element 60 that is supported by the first molded element 46 in the closing position of the door wing 40 according to FIG. 9 then engages in a form-fitting manner in the clearance 10. The direction of the form-fit which here runs perpendicularly to the oblique distancing movement of the door wing 40, indicated by the arrow 8, assumes an acute angle $_a$ in relation to the plane of the door wing 40. However, the direction of the form-fit is then also imparted a vectoral component which is parallel with the plane of the door wing 40 and, on account thereof, fixes the door wing 40 perpendicularly to the travel direction of the rail vehicle 1 on the vertical strut 52 of the door portal 50.

In the case of the embodiment of FIG. 10 the conditions are exactly reversed in relation to FIG. 9, wherein the clearance 10 on the first molded element 46, conjointly with the sealing element 60 disposed in the clearance 10, is configured so as to have an annularly encircling hollow region 34, and a protrusion 6 which engages in the clearance 10 in the closing position, or plunges into the latter, so as to initiate the form-fit is configured on the second molded element 48.

The embodiment of FIG. 11 is similar to that of FIG. 9, wherein the sealing element 60 that is fastened to the first molded element 46 is again configured so as to be annular, having an annularly encircling hollow region 34, wherein the sealing element 60 in the closing position in this instance is received in a form-fitting manner in a complementary and wedge-shaped cavity 62 of the second molded element 48.

Embodiments which include arbitrary combinations of features of the embodiments described here are also included in the scope of the disclosed embodiments.

LIST OF REFERENCE SIGNS

1 Vehicle
2 External wall
4 Detent
6 Protrusion
8 Arrow
10 Clearance
12 Clearance
14 Cavity
16 Arrow
18 Second leg
20 First leg
22 Seal lips
24 Base
26 Second leg
28 First leg
30 Door module
32 Arrow
34 Hollow region
36 Arrow
38 Clearance
40 Door wing
42 Door opening
44 Vertical periphery
46 First molded element
46A First leg
46B Second leg
48 Second molded element
48A First leg
48B Second leg
50 Door portal
52 Vertical strut
54 Vertical strut
56 Horizontal strut
58 Horizontal strut
60 Sealing element
62 Cavity

The invention claimed is:

1. A door module for the disposal in a door opening of a wall of a car body of a rail vehicle, comprising:
   at least one door wing;
   a door portal which comprises two vertically disposed struts and two horizontally disposed struts, wherein the door wing is movable, relative to the door portal, between an opening position of a closing position;
   at least one elastically deformable sealing element which in the closing position seals at least one vertical periphery of the door wing in relation to one of the vertically disposed struts of the door portal;
   an electronic door control system which is provided for locking/unlocking or blocking/releasing the at least one door wing in relation to the door portal; and
   at least one first molded element that is disposed on the vertical periphery of the door wing, and at least one second molded element that is disposed on the vertical strut of the door portal,
   wherein the first molded element and the second molded element only in the closing position of the door wing automatically engage in one another in such a manner that, when viewed in a direction perpendicular to the plane of the door wing, an indirect form-fit is automatically produced between the first molded element and the second molded element, but such a form-fit is or will be automatically canceled in a position of the door wing that deviates from the closing position, and wherein the automatic accomplishing and canceling of the form-fit is controlled by the movement of the door wing in the closing or opening direction and is separate from and independent of the electronic door control system
   wherein first and second wedge faces that are configured to be complementary are disposed on the first molded element and on the second molded element,
   wherein the form-fit or the sealing effect of the first and second wedge faces, in a movement of the door wing proceeding from a position of the door wing in which the latter has not yet fully assumed the closing position, increases in the direction toward a terminal position of the closing position.

2. The door module of claim 1, wherein the at least one elastically deformable sealing element is configured so as to be separate from the first molded element and the second molded element.

3. The door module of claim 2, wherein the first molded element or the second molded element support the at least one elastically deformable sealing element in such a manner that the at least one elastically deformable sealing element when accomplishing the form-fit in the closing position configures a component part of the form-fit,
   wherein the elastically deformable sealing element, supported by the first molded element, and the second molded element mutually engage in a form-fitting manner, or
   wherein the elastically deformable sealing element, supported by the second molded element, and the first molded element mutually engage in a form-fitting manner.

4. The door module of claim 1, wherein
   the first molded element is disposed on a door face of the door wing which, when viewed in relation to the car body, points inward, and the second molded element is disposed on a strut face of the vertical strut of the door portal which, when viewed in relation to the car body, points outward, or
   the first molded element is disposed on a door face of the door wing which, when viewed in relation to the car body, points outward, and the second molded element is disposed on a strut face of the vertical strut of the door portal which, when viewed in relation to the car body, points inward.

5. The door module of claim 1, wherein the at least one elastically deformable sealing element has an encased hollow region.

6. The door module of claim 1, wherein the first molded element and the second molded element and/or the at least one elastically deformable sealing element are disposed so as to be coplanar in relation to the plane of the door wing.

7. The door module of claim 1, wherein the first molded element and the second molded element and/or the at least one elastically deformable sealing element are disposed so as to be outwardly or inwardly offset in relation to the plane of the door wing.

8. The door module of claim 1, wherein in relation to the vertical disposal and extent of the molded elements it is provided:
   a first molded element is disposed so as to be approximately centric in relation to the vertical periphery of the door wing, and a second molded element is disposed so as to be approximately centric in relation to the vertical strut of the door portal, or
   the first molded element is disposed in relation to the vertical periphery of the door wing and the second molded element is disposed in relation to the vertical strut of the door portal, in each case so as be along the entire vertical extent of the vertical periphery of the door wing and of the vertical strut of the door portal, or a plurality of first molded elements are disposed in relation to the vertical periphery of the door wing, and a plurality of second molded elements are disposed in relation to the vertical strut of the door portal, so as to have in each case a mutual vertical spacing.

9. The door module of claim 1, wherein the door wing carries out a combined distancing/displacing movement or only a linear displacing movement in relation to the door portal.

10. The door module of claim 1, wherein the-door module has two door wings, wherein first and second molded elements are in each case disposed on the two vertical struts of the door portal as well as on the opposite vertical peripheries of both door wings, and at least one elastically deformable sealing element is assigned to each pairing of one vertical periphery of a door wing and one vertically disposed strut of the door portal.

11. A car body for a rail vehicle having at least one wall having the door module of claim 1.

12. A rail vehicle having the body of claim 11.

* * * * *